United States Patent
Isaacson et al.

(10) Patent No.: US 8,176,825 B1
(45) Date of Patent: May 15, 2012

(54) BRAZED ROTARY CUTTING TOOL, AN INSERT FOR A BRAZED ROTARY CUTTING TOOL, AND METHODS FOR MANUFACTURING THE SAME

(76) Inventors: Glenn Isaacson, Ingleside, IL (US); Mark P. O'Brien, Libertyville, IL (US)

( * ) Notice: Subject to any disclaimer, the term of this patent is extended or adjusted under 35 U.S.C. 154(b) by 664 days.

(21) Appl. No.: 11/805,061

(22) Filed: May 22, 2007

Related U.S. Application Data

(60) Provisional application No. 60/802,477, filed on May 22, 2006.

(51) Int. Cl.
*B23D 57/00* (2006.01)
(52) U.S. Cl. .............. 83/835; 83/847; 83/854; 175/435; 407/118; 407/32
(58) Field of Classification Search .................... 29/412, 29/417, 411; 175/435; 408/144, 145; 83/854, 83/835, 847; 407/118, 42, 34, 32, 113, 119, 407/54, 53
See application file for complete search history.

(56) References Cited

U.S. PATENT DOCUMENTS

| 4,764,059 A | * | 8/1988 | Wale .............................. 407/42 |
| 5,141,289 A | * | 8/1992 | Stiffler ........................ 299/111 |
| 5,195,404 A | * | 3/1993 | Notter et al. ................ 76/108.6 |
| 5,351,772 A | * | 10/1994 | Smith ........................... 175/428 |

OTHER PUBLICATIONS

When Brazing Beats Welding. http://machinedesign.com/article/when-brazing-beats-welding-1209. Dec. 2004.*
"Handbook of Mold, Tool, and Die Repair Welding". Thompson, Steve © 1999 Woodhead Publishing.*
"Metallurgy of Welding" (chapter 4). Lancaster, J.F. © 1999 Woodhead Publishing.*
The Weldon Tool Company Catalog 1998, pp. 1-4, 45-49.

* cited by examiner

*Primary Examiner* — Sean Michalski
(74) *Attorney, Agent, or Firm* — Kurt W. Rohde; McDonnell Boehnen Hulbert & Berghoff LLP

(57) ABSTRACT

A method for producing carbide and diamond cutting tool inserts adapted to compensate for braze-induced warp is provided. In this method, the anticipated warpage of the insert from brazing is considered prior to cutting the insert from a PCD and carbide disk and the cutting path for the insert is adjusted to compensate. The adjusted cutting path creates an insert shape that, after warping as a result of the brazing process, will conform substantially to the originally intended insert or cutting tool shape. Also, a method of providing relief on the bottom surface of a brazeable insert is provided. Further, tools produceable by these methods are disclosed, such as a diamond edged rotary cutting tool with a substantially sinusoidal rake face and cutting edge.

11 Claims, 11 Drawing Sheets

PRIOR ART

BRAZED ROTARY CUTTING TOOL, AN INSERT FOR A BRAZED ROTARY CUTTING TOOL, AND METHODS FOR MANUFACTURING THE SAME

PRIORITY OF THE INVENTION

This application claims priority to U.S. Provisional Patent Application Ser. No. 60/802,477 filed May 22, 2006, incorporated by reference herein in its entirety.

FIELD OF THE INVENTION

The present invention relates generally to rotary cutting tools and the manufacture thereof, and more particularly, to the manufacture and use of pre-warped carbide and diamond inserts for the construction of brazed rotary cutting tools.

BACKGROUND

Brazed rotary cutting tools include, but are not limited to: endmills, router bits, shapers, drills, reamers, counterbores, countersinks, and taps. In designing and using such cutting tools, significant attention is paid to both the wear resistance and to the dimensional precision of a tool. As a result, significant efforts are made to improve those characteristics, while constraining any cost increases such improvements might have upon the construction price of the cutting tools.

Wear resistance is typically affected by the material that forms the cutting surface of the tool, the geometry of the cutter, and the material being cut. Cutter wear is typically measured by monitoring specific changes in the cutting edge of the tool. As the tool experiences wear, the cutting edge will begin to break down and exhibit a loss of cutting edge material. Such loss may be exhibited by the formation of a wear radius on the cutting edge and/or by the loss of larger chunks of cutting edge material through chipping or other destructive means. Over time, material suppliers have developed new or improved materials which reduce the rate of cutter wear. Manufacturers have dramatically reduced wear in many applications by moving from high-carbon steel, to high-speed steel, to carbide, and finally to diamond products such as polycrystalline diamond ("PCD"). However, this increased wear resistance comes at the price of increased material costs and manufacturing difficulties.

Diamond has proven to be an extremely wear resistant tool material, especially for machining advanced, but abrasive, composite materials such as carbon fiber and aramids. However, unlike steel and carbide, the high cost and difficult working characteristics of diamond prevent its use as a both a structural body material and a cutting edge material. Instead, diamond tools are typically of a two piece design in which one material acts as the tool body and a segment of PCD is situated only at the cutting edge. While this is the common structure of PCD cutting tools, manufacturers still find it difficult to attach diamond directly to the tool body material and to thereafter shape it to the desired cutting edge profile.

To solve the attachment problem, manufacturers have resorted to a number of construction methods. In one exemplary method, manufacturers fix thin slabs of diamond to thicker carbide disks, where the carbide serves as a backer material supporting the brittle diamond structure. Controlled atmosphere brazing is one common method of fixing the diamond to the carbide slug. Another common method is the pressing and then sintering of a carbide and diamond composite compact.

In FIG. 1, a commercially available PCD and carbide disk 100 is shown. The disk consists of a wear layer 101 of PCD typically ranging in thickness from 0.005" to 0.125", and most typically from 0.010" to 0.040". It is known by those skilled in the art that the wear layer 101 may instead consist of a layer of polycrystalline cubic boron nitride ("PCBN"). The PCD layer 101 is permanently bonded to a carbide layer 102, where the carbide consists primarily of tungsten carbide and various other compounds which are used as binders or to impart specific properties such as toughness or hardness to the carbide layer.

Using the PCD and carbide disk 100 as raw material stock, an insert manufacturer will typically cut or grind specifically shaped cutting tool inserts from the disk 101. Most often, the insert manufacturer will use electrical discharge machining ("EDM") to cut the insert from the disk 100. For purposes of illustration, a representation of a portion of an EDM wire 103 is shown passing through the disk 100 at an angle 104.

FIG. 2 is a top view of the PCD and carbide disk 100 showing EDM cut paths for an exemplary insert shape. The EDM wire 103 may be used to form a flat faced insert illustrated by the EDM cut pattern 201. One skilled in the art will understand that other methods, such as grinding, may also be used to form an insert from the disk 100.

FIG. 3 shows a perspective view of an exemplary flat face insert 300 formed from the PCD/carbide disk 100. The insert 300 is cut in such a manner that a straight cutting edge 301 is formed at the interface of the flat rake face 303 and the flat relief surface 304. The EDM cut path results in a straight bottom edge 302 at the base of the rake face 303. Typically, a portion of the insert 305 may be removed from the back bottom corner of the insert. This portion 305 is removed by any practical material removal process, such as grinding or EDM, and the resulting angle 306 is typically formed at substantially 90 degrees in order to facilitate later mounting of the insert 300 in a fluted tool body.

Angle 307 of the insert is known as the included angle and is defined herein as the angle formed substantially at the cutting edge 301 and between the rake face 303 and the relief surface 304. The included angle 307 may typically be less than 90 degrees. The benefit of having an included angle 307 of less than 90 degrees is that the insert may be mounted to a tool body and no further material must be removed to create an appropriately shaped relief surface 304 behind the cutting edge. FIGS. 7 and 8, discussed later in relation to aspects of the invention, illustrate the location of the relief surface in more detail.

Typically, the cut pattern 201 in the disk 100 is oriented such that wear layer 101 forms the relief surface 304. This is done so that a wear resistant cutting edge 301 is produced with minimal use of the expensive wear layer material. In an alternative configuration, where the wear layer 101 is oriented to form the rake face (configuration not shown), the cutting edge may still be wear layer material; however, more wear layer material is required to cover the large rake face and, consequently, the insert is more expensive to produce. In either configuration, a significant portion of either or both the rake face and the relief surface consist of wear layer material.

Once the insert 300 is produced, one or more of the inserts 300 are mounted to a cutting tool body in order to create a semi-finished tool. One carbide surface of the insert 300 is typically oriented towards the mounting interface with the tool body, as shown with reference to FIGS. 4A and 4B. Brazing is the common method of fixing the insert to the tool body. The semi-finished tool is then subject to some form of material removal process, such as grinding or electrical discharge machining ("EDM"), where the cutting edge is brought to the desired condition, shape, and dimensions.

A problem with this method for producing PCD (or PCBN) edged cutting tools is that carbide and diamond inserts warp during the brazing process that fixes them to the tool body. PCD and carbide typically exhibit different coefficients of thermal expansion. During the brazing process, the high temperature used to melt the silver solder or other brazing material causes the PCD and carbide sections of the insert to expand at different rates. As a result, the insert warps in one or more dimensions. This warpage causes numerous problems. First, the warped surfaces will change the dimensional characteristics of the assembled tool, thereby necessitating allowances for additional grinding stock to compensate for high and low spots on the rake face and relief surface. Second, warpage can result in the insert rocking against the bottom mounting surface of a fluted tool body during or before brazing, resulting in difficulty maintaining alignment of the insert to the tool. Third, PCD is extremely difficult to machine. Significant cost is attributable to the removal of excess grinding stock from the assembled tool by traditional EDM or tool grinding methods.

To illustrate the problems cause by braze-induced warping of the insert, FIG. 4A shows an endmill type rotary cutting tool 400 with exemplary flat faced insert 300 mounted in a cutting tool body 406. Normally, the insert 300 is seated such that its flat bottom edge 302 is in contact with the bottom of the flute, thus helping to align the cutting edge 301 to within some desired level of concentricity, taper, and/or runout to the cutting tool 400 and/or to other cutting edges present on the cutting tool.

As previously stated, the common means for attaching insert 300 to the tool body 406 is by brazing. During brazing, flux and silver solder or other appropriate materials are placed between the insert 300 and the tool body 406. The assembly is then heated to a high temperature using a torch or induction heating methods. The assembly is heated to the point that the silver solder melts and bonds the insert 300 to the tool body 406. A known problem is that the heating of the insert 300 can cause it to permanently warp due to the different coefficients of thermal expansion between the insert's 300 wear layer and carbide layer.

Two specific problems of insert warping are illustrated in FIG. 4B. First, during the heating and cooling associated with brazing the insert 300 to the tool body 406, the PCD and carbide expand at different rates and the insert 300 becomes deformed, as shown by the post-braze insert 409. As a result of the insert warpage, the cutting edge 401 may exhibit a curved shape. The cutting edge corners, such as corner 411, may circumscribe a larger cutting edge diameter than the diameter circumscribed by the middle of the cutting edge 412.

The amount of warp, approximated as dimension 404 in this view, is measured as the diametric radial distance between the high corner 411 and the low center point 412. Diametric radial distance is defined herein as the radial distance between the circles circumscribed by two points, where the circles are approximately concentric to the axis of rotation of the tool. Though the amount of cutting edge warp 404 depends on numerous factors, including, but not limited to, the composition of the PCD layer, the composition of the carbide layer, the heating method, and the length of the insert, the amount of warp 404 is generally predictable, repeatable, and within a narrow band of variance for most commercially available carbide and PCD disk 100 compositions and insert sizes.

Braze induced insert warpage of a flat face insert creates a cutting edge profile that may exhibit substantial problems with concentricity, taper, and/or runout due to the movement of various portions of the post-braze cutting edge 401 from the straightness of the pre-braze cutting edge 301. Similar problems exist for shape face inserts. As a result, the cutting edge tolerances of the finished tool must either be loosened to accommodate these warp effects or, more commonly, additional material removal operations must be performed on the cutting edge 401 after the inserts are brazed to the tool. These additional finishing operations are undesirable because current material removal processes are not well suited for the work. Grinding operations using diamond superabrasive wheels are slow when used for grinding hard polycrystalline diamond cutting edges and EDM machines are also slow when performing finishing work on rotary cutting tools.

A second problem associated with braze-induced insert warpage is illustrated by the insert's warped bottom edge 402. This edge, along with the entire bottom insert surface, warps similarly to the cutting edge, though the amount of bottom edge warp 405 may be greater or less than the amount of cutting edge warp 404. This bottom warp can result in a single point of contact 408 at the interface between the bottom of the flute 407 and the bottom edge of the insert 402. Compared to a normally flat interface, such as between the pre-braze bottom edge 302 and the bottom of flute 407 in FIG. 4A, this single point of contact 408 allows the insert 409 to shift or rock back and forth within the flute 407 during brazing. Consequently, it is difficult to maintain accurate positioning of the insert 409 relative to the tool body 406. This further contributes to problems of concentricity, taper, and/or runout and again requires looser tolerances or additional material removal operations after brazing.

SUMMARY

In accordance with one aspect of the invention, a method for manufacturing a brazeable rotary cutting tool insert is provided. The method includes providing a disk with a plurality of layers, wherein one layer is a carbide layer and another layer is a wear layer. The method further includes forming the insert from the disk. The insert has a rake face and a relief surface and the relief surface adjoins the rake face to form a cutting edge. The insert is formed such that the cutting edge and the rake face each have a bowed profile. The bowed profile of the rake face is determined by determining the amount of brazing-induced warp along the cutting edge and basing the bowed profile of the rake face, at least in part, on the amount of brazing-induced warp along the cutting edge.

In accordance with another aspect of this invention, another method for manufacturing a brazeable rotary cutting tool insert is provided. The method includes providing a disk with a plurality of layers, wherein one layer is a carbide layer and another layer is a wear layer. The method further includes forming the insert from the disk, determining the amount of brazing-induced warp along the bottom surface of the insert, and forming a relief in the bottom surface to a depth based, at least in part, on the amount of brazing-induced warp along the bottom surface. This makes it easier to maintain alignment between the insert and the tool body as compared to normally formed inserts which can exhibit a "rocking" single point of contact on the bottom interface during brazing.

In accordance with another aspect of this invention, a method for manufacturing a brazed rotary cutting tool is provided. The method includes placing an insert in proximity to a tool body and brazing the insert to the tool body. The insert consists of a wear layer and a carbide layer, has a cutting edge and a rake face, and the rake face has a profile adapted to compensate for brazing-induced warp along the cutting edge.

In accordance with another aspect of this invention, a brazeable insert for a rotary cutting tool is provided. The tool comprises a wear layer, a carbide layer, a cutting edge relief surface, and a rake face. The rake face exhibits a profile adapted to compensate for brazing-induced warp of a cutting edge formed by the interface of the rake face and the cutting edge relief surface.

In accordance with another aspect of this invention, a brazed rotary cutting tool is provided. The tool comprises a tool body and a plurality of inserts brazed to the tool body. Each insert comprises a wear layer and a carbide substrate. The inserts form at least two cutting edges and a portion of each cutting edge exhibits a profile substantially resembling a wave form. The locations of wave form peaks along the longitudinal length of each cutting edge are offset from one cutting edge to another. Further, each insert has a rake face profile substantially resembling a wave form.

BRIEF DESCRIPTION OF THE DRAWINGS

Preferred embodiments of the present inventions, as well as prior art, are described with reference to the following Figures, wherein like reference numerals refer to like elements in the various figures, and wherein:

FIG. 4A shows an insert without distortion and FIG. 4B shows an insert with braze-induced distortion, in accordance with prior art;

DETAILED DESCRIPTION

1. Prior Art

Figure 1:
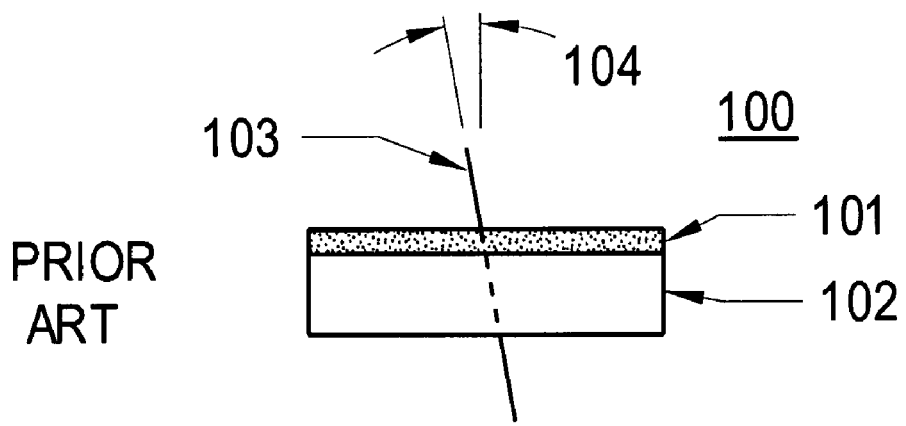
FIG. 1 is a side elevation view showing a typical prior art PCD and carbide disk with an EDM wire passing through the disk.

FIG. 1 is a side elevation view showing a typical prior art PCD and carbide disk 100 with an EDM wire 104 passing through the disk and is discussed in the background section above.

Figure 2:
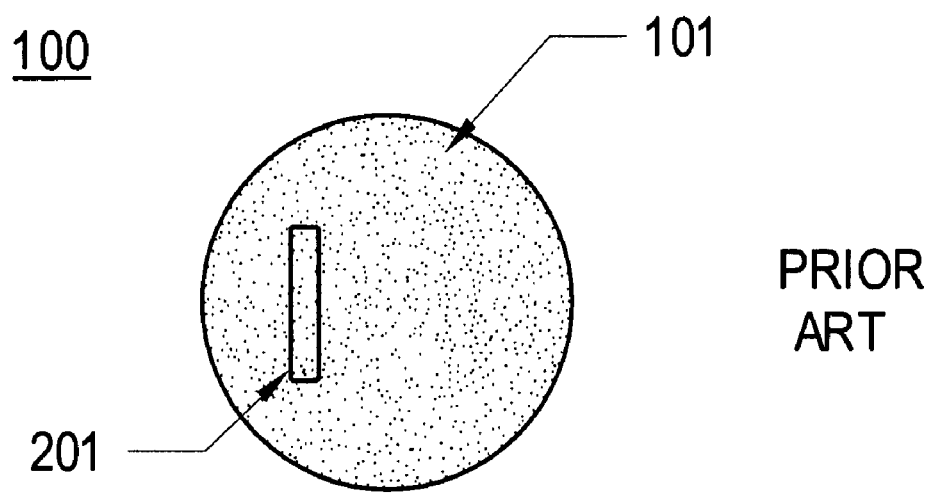
FIG. 2 is a top view of the prior art PCD and carbide disk showing exemplary EDM cut paths for a typical prior art insert shape.

FIG. 2 is a top view of the prior art PCD and carbide disk 100 showing exemplary EDM cut paths for a typical prior art insert 201 shape and is discussed in the background section above.

Figure 3:
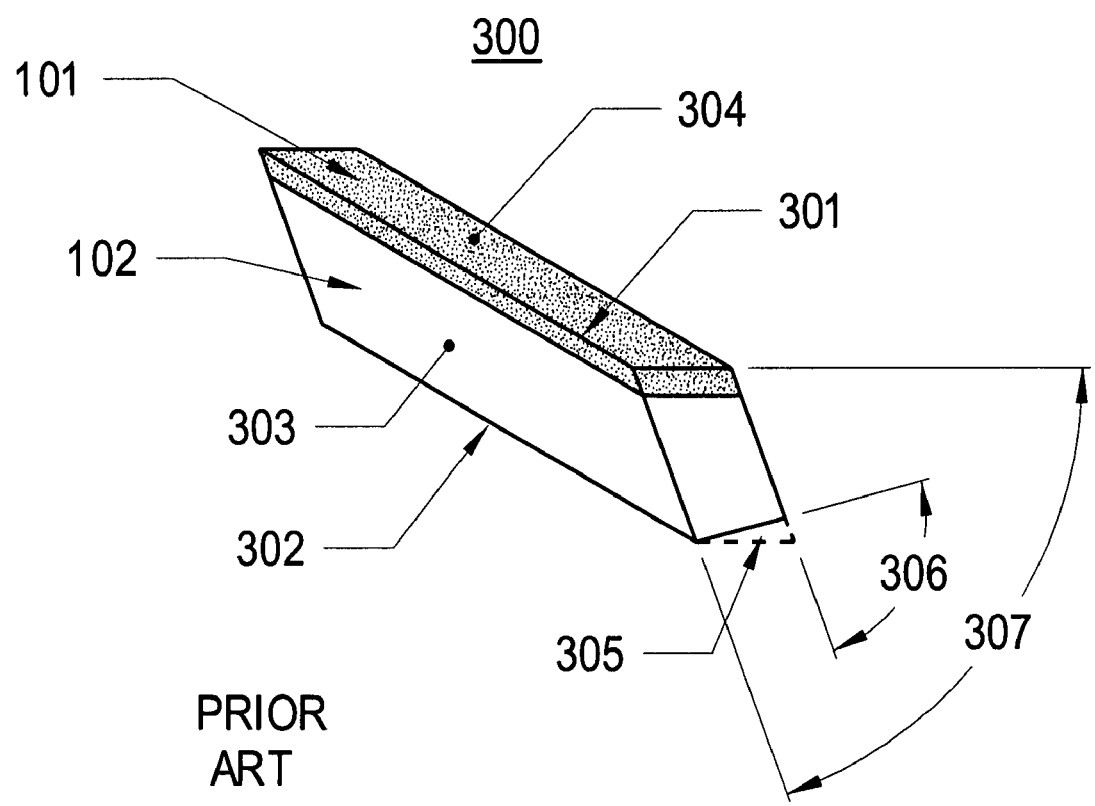
FIG. 3 is a perspective view of a typical prior art cutting tool insert.

FIG. 3 is a perspective view of a typical prior art cutting tool insert and is discussed in the background section above.

Figure 4A:
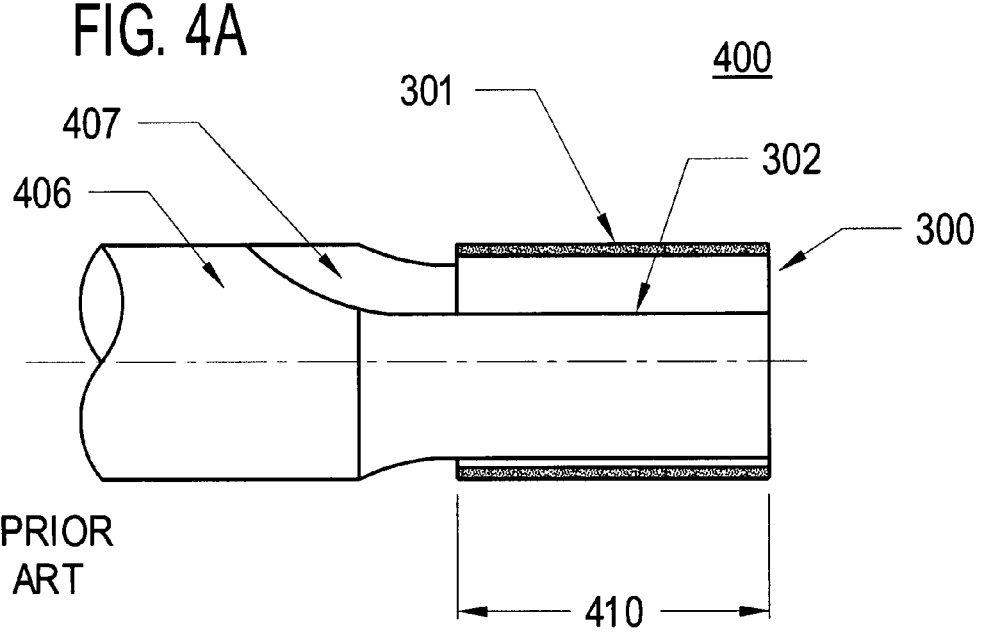
FIGS. 4A and 4B are side elevation views of a typical prior art cutting tool, where
Figure 4B:
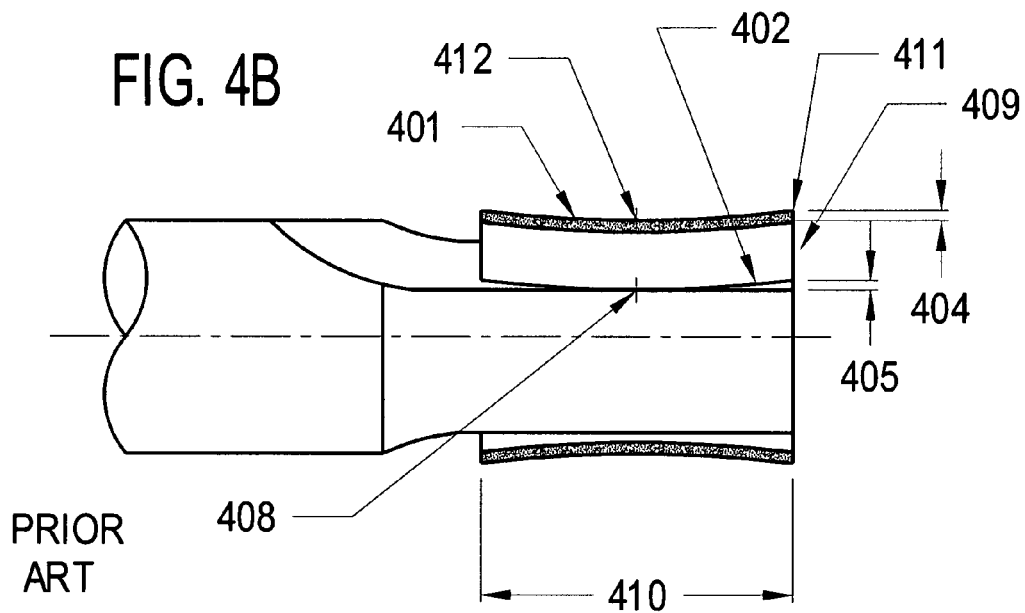

FIGS. 4A and 4B are side elevation views of a typical prior art cutting tool, where FIG. 4A shows an insert without distortion and FIG. 4B shows an insert with braze induced distortion and are discussed in the background section above.

Figure 6:
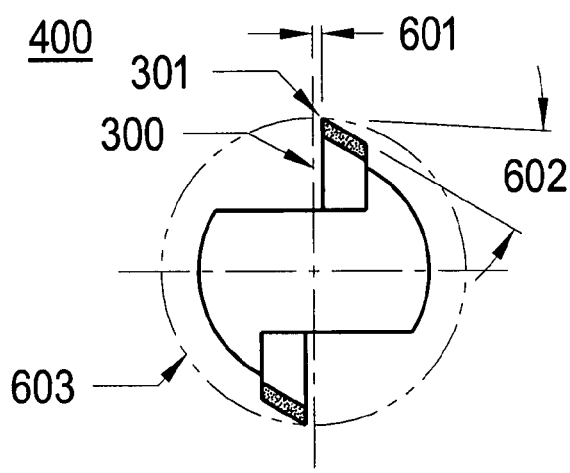
FIG. 6 is a typical prior art end view of a router bit or endmill type rotary cutting tool.

FIG. 6 is a typical prior art end view of a router bit or endmill type rotary cutting tool and is discussed in detail below.

2. Rake Face and Cutting Edge Bow

Figure 13:
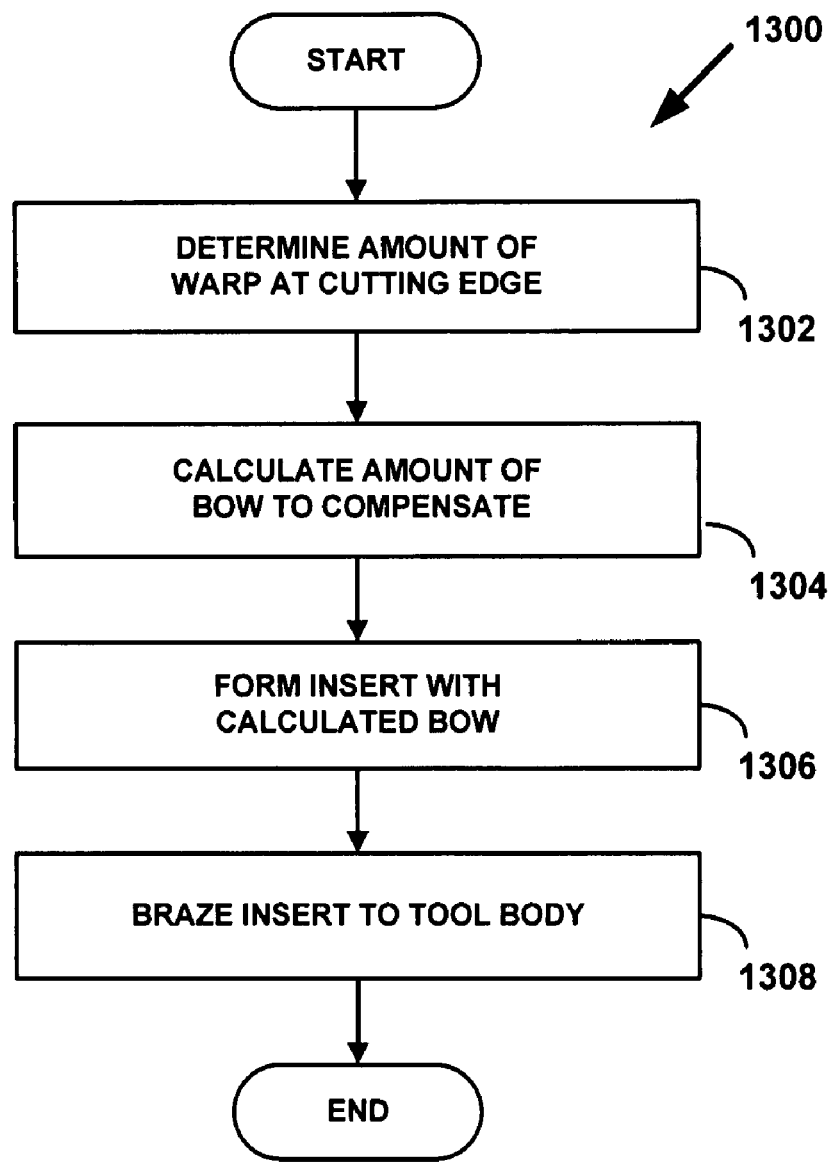
FIG. 13 is a flowchart illustrating steps for manufacturing an insert and a rotary cutting tool in accordance with a method of this invention.

FIG. 13, together with FIG. 4A through FIG. 7, provides a roadmap to a method of this invention. In order to form an insert and a finished cutting tool that does not suffer from cutting edge distortion or concentricity, runout, or taper deficiencies due to braze-induced warp, a manufacturer may employ method 1300. At block 1302, the manufacturer may determine the amount of warp experienced or expected at the cutting edge of a tool post-brazing, as per the description associated with FIGS. 4A and 4B, and also as described below with respect to expected warp. At block 1304, the manufacturer may calculate the amount and profile of the bow required to counteract the cutting edge warp, as per the description associated with FIGS. 5A, 5B, 6, and 7. As used here, and also throughout this description, "amount of bow" and "profile of the bow" should be considered interchangeable, as the former may be used to refer to a rake face profile that exhibits a smooth curve, as in FIG. 5B, and the latter may be used for a more complex shaped face insert, where the compensating bow dimensions do not exhibit a smooth curved. At block 1306, the manufacturer may form the insert using EDM or other techniques described herein, taking into account the amount and profile of the bow calculated in block 1304. If the manufacturer is making a finished cutting tool, then at block 1308, the manufacturer may braze the insert into a cutting tool body and forego any finishing operations directed to the cutting edge diameter, profile, concentricity, taper, and/or runout.

Figure 5A:
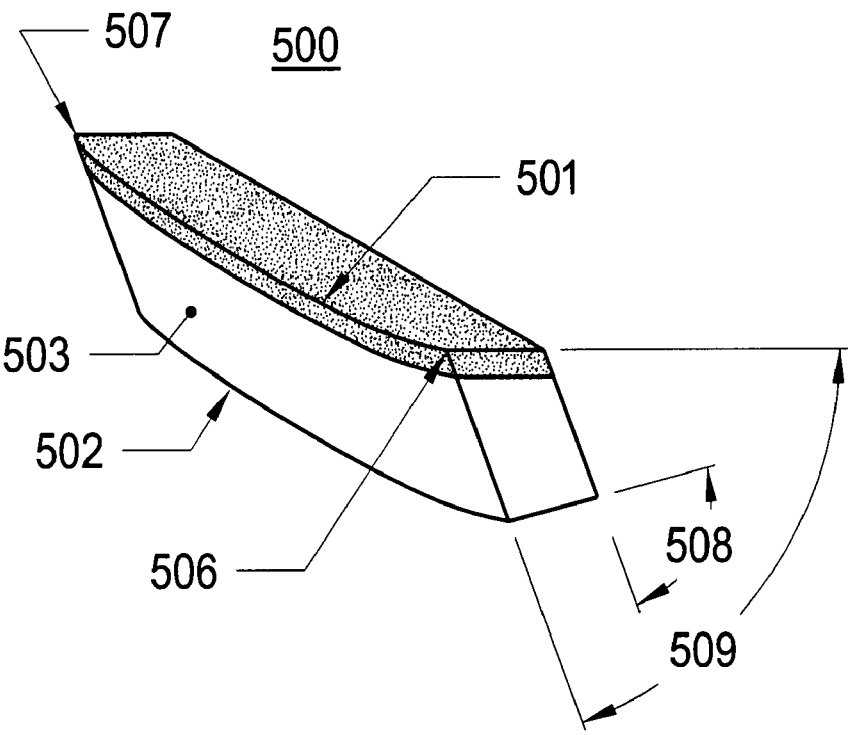
FIGS. 5A and 5B are perspective and top views, respectively, of a cutting tool insert with a convex bow, in accordance with this invention.
Figure 5B:
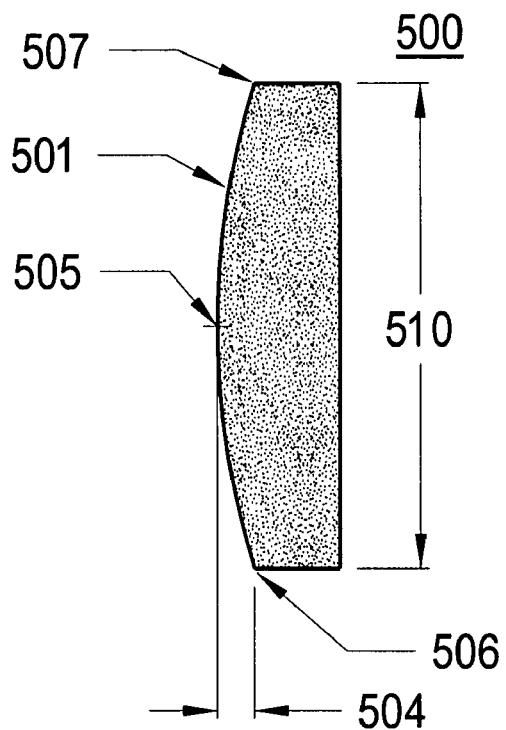

FIGS. 5A and 5B are perspective and top views, respectively, of an exemplary insert 500 formed with a convex bow, in accordance with one embodiment of this invention. The insert 500 may be cut from the disk 100 such that the rake face 503 and the cutting edge 501 are cut with a slight convex curve or bow, shown here significantly exaggerated. The bow of the rake face 503 and the cutting edge 501 serves to counteract the distortion effects that result when the insert 500 is brazed to a cutting tool, as further described with reference to FIGS. 7 and 8. For the exemplary insert shown in FIGS. 5A and 5B, the amount of bow is shown as dimension 504.

The amount of bow 504 required to counteract the brazing-induced distortion will vary depending on the amount of warpage 404 exhibited by the insert. However, given that the warpage amount 404 is reasonably predictable and constant across a range of insert compositions and sizes, the amount of bow 504 can be readily determined for many inserts by one skilled in the art, as described in more detail with reference to FIGS. 7 and 8.

As an example, if exemplary insert 409 has a 1.0" cutting edge length 410 and a carbide layer consisting of 84% to 98% tungsten carbide, it will typically exhibit cutting edge warp 404 of between 0.002" to 0.008". A similar insert with a cutting edge length 410 of 0.75" will typically exhibit a cutting edge warp 404 of between 0.001" and 0.006". In a preferred embodiment, for an insert 500 with a cutting edge length 610 of 1.0" and a cutting edge warp 404 of 0.003", a bow amount 504 of approximately 0.014" will correct the cutting edge of the finished cutting tool such that it acts as a substantially flat, non-tapered, and concentric cutting edge.

The curve of the insert's cutting edge 501 and rake face 503 may be formed using a radius. In the instant example, a radius of 8.0"-9.0" will produce approximately the 0.014" of bow 504 needed to correct the amount of warp caused by brazing. The curve need not be a radius, however, but may instead be elliptical or a higher order curve depending on the geometry of the insert and its warpage characteristics. In cases where the post-braze warp profile of the pre-braze cutting edge 401 and/or the amount of cutting edge warp 404 are unknown, the curve of the cutting edge 501 may be determined quickly by means of measuring, brazing, and re-measuring a sample insert.

Figure 7:
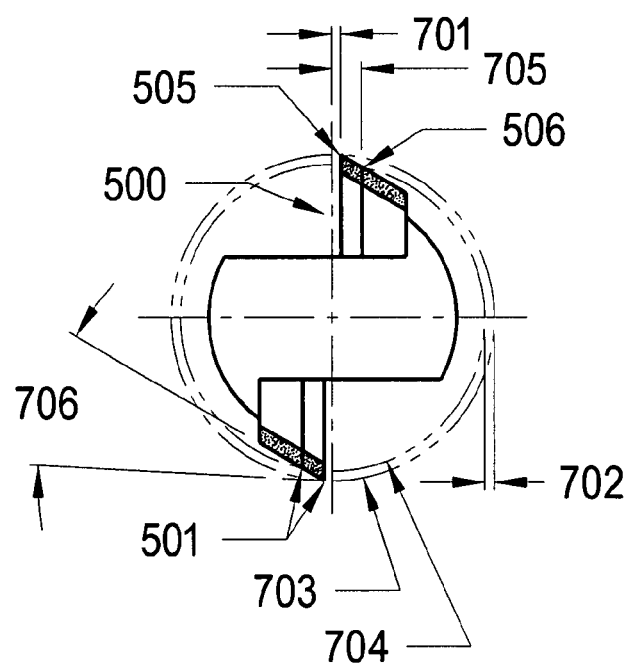
FIG. 7 is an end view of a router bit or endmill type rotary cutting tool, in accordance with this invention.
Figure 8:
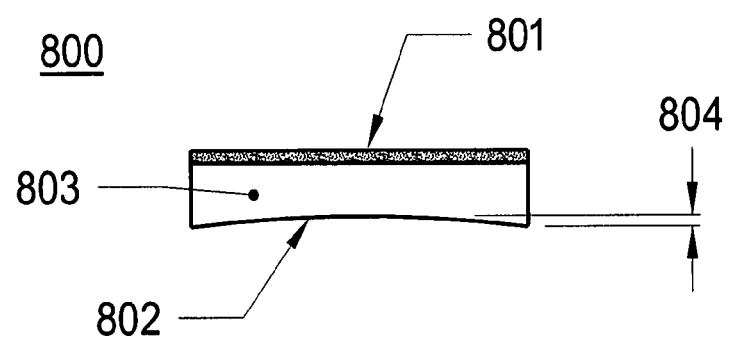
FIG. 8 is a representative view of the rake face of a cutting tool insert, in accordance with this invention.

Using FIGS. 7 and 8, one skilled in the art will understand the steps needed to determine the shape of the bowed cutting edge 501 and the amount of bow 504 required for a given insert. FIGS. 7 and 8 also help illustrate how the bow of cutting edge 501 corrects for the post-braze warp of cutting edge 401. It should be noted that any insert shape, including the sinusoidal face insert 1000, discussed later, and other shaped inserts, can be substituted for the flat face insert 300 shown in FIG. 6 and the pre-warped insert 500 shown in FIG. 7.

FIG. 6 shows a prior art end view of exemplary cutting tool 400 prior to brazing and rotated so that the rake face is vertical. The rake face offset 601 is defined as the distance between the rake face and a parallel center line of the cutting edge diameter 603. The cutting edge diameter 603 is determined by circumscribing the cutting edge 301 around the center axis of rotation of the cutting tool 400. Additionally, an exemplary relief angle 602 is shown. It should be noted that the rake face offsets and relief angles shown here, and elsewhere, are for illustrative purposes only and other variations are possible. In various embodiments, the rake face offset 601 may be a positive value as shown, it may be a zero value if aligned on the center line, or a negative value if located "ahead of center," or to left of the center line.

FIG. 7 is an end view of a router bit or endmill type rotary cutting tool, in accordance with this invention and may be used to describe how one skilled in the art can translate known diametric radial distances between points on a cutting edge into the appropriate bow configuration of cutting edge 501. Referring briefly back to FIG. 5, the diametric radial distance between the high corner 411 and the low middle 412 of the cutting edge 401 is defined as the amount of warp 404. If the amount of warp 404 were unknown for this particular insert 300, a manufacturer may determine the amount of warp 404 by brazing the insert 300 to a tool body 406 and directly measuring the amount of warp 404 by means commonly known in the art, such as dial indicators or visual comparators equipped with coordinate measuring systems.

In FIG. 7, the end view of a rotary cutting tool is shown with insert 500 mounted, but not yet brazed or warped from brazing. The insert 500 is formed so that the cutting edge point known to circumscribe the smallest cutting edge diameter after brazing, here exemplified by point 505 in the center of the cutting edge 501, is located at the intended final cutting edge diameter 703 prior to brazing. Because insert 500 exhibits a bow on its face 503 and cutting edge 501, the rake face offset 705 at the corner 506 will be greater than the rake face offset 701 at the center point 505, as shown significantly exaggerated in FIG. 7. Before brazing, the difference in rake face offsets causes the corner 506 to circumscribe a cutting edge diameter 704 smaller than the intended cutting edge diameter 703, the difference being the diametric radial distance 702. After brazing, the corners of this type of insert will warp up, as previously illustrated in FIG. 5, and create a larger circumscribed cutting diameter. Because the amount of cutting edge warp can be determined, for example, as described above with respect to cutting edge warp 404, the rake offset 705 of corner 506 can be adjusted so that the final cutting edge diameter at corner 506 after brazing induced warp is equal to the intended cutting edge diameter 703 for the entire cutting edge.

To accomplish the adjustment, the amount of rake offset 705 needed at corner 506 can be determined by setting the diametric radial distance 702 equal to the amount of cutting edge warp 404 and then graphically drawing the intended cutting diameter 703, the rake face offset 701, the relief angle 706, and a smaller diameter 704 concentric with and equal to the intended cutting diameter minus twice the diametric radial distance 702 or, equivalently, (DIAMETER of 704)= (DIAMETER of 703)−2*(DIAMETRIC RADIAL DISTANCE 702). The intersection of the relief angle 706 with the small diameter 704 defines the rake face position of corner 506. This allows one to measure the rake face offset 705 as the distance from the vertical rake face at 506 to the parallel center line of the tool. The difference between rake face offsets 701 and 705 is equal to the amount of bow 504.

Knowing the amount of bow 504 between points 506 and 505 allows one to draw a smooth, symmetrical curve between points 506, 505, and the far corner point 507, thus defining the shape of the curved cutting edge 505 and the rake face 503. For purposes of greater accuracy, those skilled in the art should recognize that this method of the claimed invention may be scaled up to include any number of points beyond the points used here. This is particularly applicable for shaped cutting edges where one would preferably match the rake offset at various points along the cutting edge to the commensurate brazing induced warp at that point. In FIG. 4, the warp of cutting edge 401 exhibits a smooth transition between the high corner 411 and the center low point 412. In order to practice the claimed invention with a sinusoidal or other shaped cutting edge, such as the cutting edge 1001 shown in FIG. 10, the amount of bow 504 may be calculated using multiple measurements taken at specific points along the cutting edge. Those multiple measurements may then be translated into multiple amounts of warp 404, with each amount attributable to a specific location along the cutting edge. Thus, the claimed method can be applied to flat face insert 300, as illustrated by FIGS. 5A, 5B, and 8, sinusoidal face inserts, or any other type of shaped or flat insert.

It should be noted that the rake faces shown in FIG. 7 at point 505 and point 506 need not be parallel to each other. The included angle 509, shown in FIG. 5, may be varied across the length of the insert so that the rake face at the center of the insert at point 505 is not parallel to the rake face at the end of the insert at point 506. This can easily be accomplished through the use of a 4-axis wire EDM machine.

For inserts with long cutting edge lengths 510, the amount of bow 504 required to compensate for cutting edge warp can negatively impact the cutting tool geometry. Long insert cutting edge lengths may be considered any insert cutting edge length 510 in excess of 1.25". For tools with long cutting edges, multiple inserts may be positioned end-to-end in order to produce the desired cutting edge length of the tool.

3. Bottom Edge Bow

Figure 14:
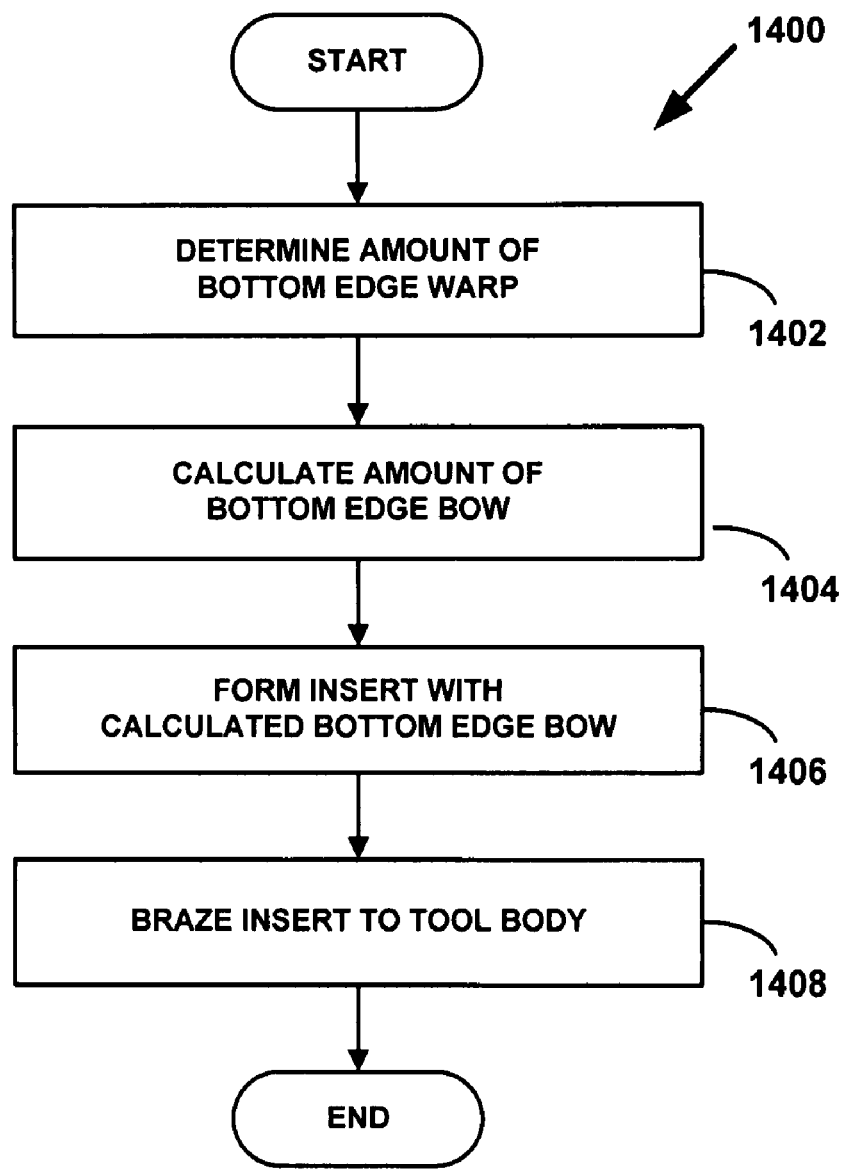
FIG. 14 is a flowchart illustrating steps for manufacturing an insert and a rotary cutting tool in accordance with a method of this invention.

Another problem stemming from brazing induced warp is that the bottom edge 402 of the insert can warp after brazing. FIG. 14, considered in conjunction with FIGS. 4A, 4B, 8, and 9, provides a roadmap to another method of this invention. In order to form an insert and a tool that does not suffer from alignment difficulties during brazing due to braze-induced warp, a manufacturer may employ method 1400. At block 1402, the manufacturer may determine the amount of warp experienced or expected at the bottom of a tool post-brazing, as per the description associated with FIGS. 4A and 4B. At block 1404, the manufacturer may calculate the amount and profile of the bow required to exactly counteract or exceed the influence of the bottom edge warp, as per the description associated with FIGS. 4A, 4B, 8, and 9. At block 1406, the manufacturer may form the insert using grinding or other material removal techniques described herein to form a bottom edge bow, taking into account the amount and profile of the bow calculated in block 1404. If the manufacturer is making a finished cutting tool, then at block 1408, the manufacturer may braze the insert into a cutting tool body and forego any finishing operations directed to the cutting edge diameter, profile, concentricity, taper, and/or runout.

FIG. 8 shows an insert 800 which is formed so as to compensate for the effects of a warped bottom edge 402. Insert 800 may be of any type, including, but not limited to, a flat face insert 300, a sinusoidal face insert 1000, and inserts produced according to aspects of the invention described herein.

Insert 800 is shown with cutting edge 801 and with rake face 803. The cutting edge 801 need not be a straight cutting edge as illustrated here. Normally, after forming an insert from a PCD disk 100 using wire EDM, as previously described, the bottom edge surface of the insert would be flat. In one embodiment of the invention, relief may be ground into the bottom edge 802, here shown as a concave radius, creating a specific amount of bottom edge bow 804. This is preferably done by grinding the profile into the carbide, but it may also be accomplished by any reasonable material removal means.

Figure 9:
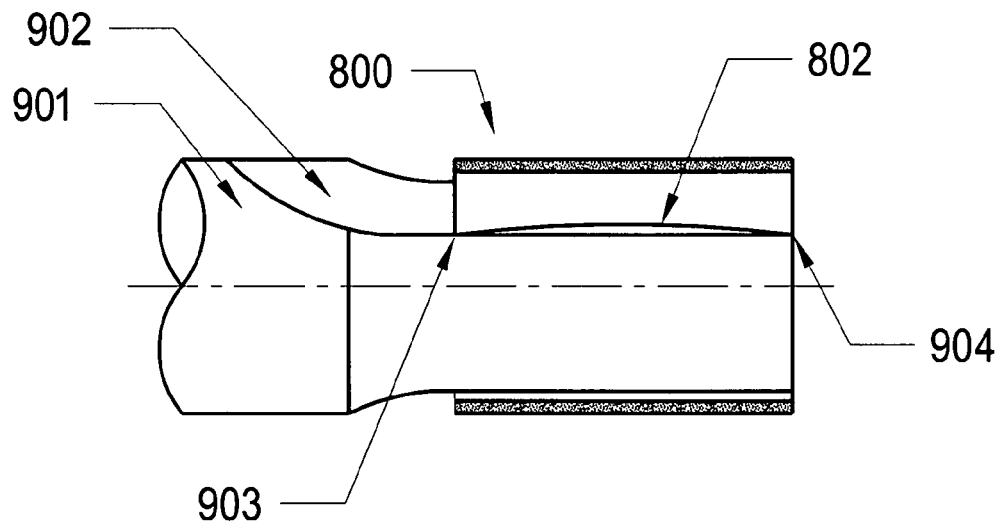
FIG. 9 is a side elevation view of a rotary cutting tool, in accordance with this invention.

The benefit of the bottom edge bow 802 is illustrated in FIG. 9. The insert 800 may be mounted into the flute 902 of tool body 901. During brazing, a normally flat insert bottom edge, such as edge 302, would warp up and create a single point of contact 408, allowing the insert to rock. Beneficially, with insert 800, two points of contact 903 and 904 between the insert 800 and the flute 902 bottom are created. These two points of contact 903 and 904 serve as a stable mounting interface between the insert 800 and the flute 902 bottom which prevents the insert 800 from rocking during assembly and brazing. The two points of contact 903 and 904 can range in width from a sharp edge to any width which does not interfere with the primary purposes of this invention. The normal width of a contact point on a 1.0" long insert would be between a sharp edge and 0.125" wide, and more preferably between 0.010" and 0.030" wide. It should be noted that the profile of bottom edge 802 need not be a radius as shown, but rather it may be any shape that produces two points of contact.

If the amount of bottom warp 405 is known, the amount of bottom edge bow 804 may alternatively be matched such that, after warping, the bottom edge 802 resumes a substantially flat, straight edge along the entire interface. If the flute mounting surface requires a shape other that a straight flat edge, for example a flute bottom may start flat and then transition to a radius, the relief grind may also be matched so that the relief conforms to the desired mounting surface after braze induced warp. Additionally, and preferably, the amount of warp 804 can be ground with sufficient excess, so that after warping, the two points of contact 903 and 904 are maintained as the only contact area between the bottom edge 802 and the bottom of the flute 902. This alleviates the need to determine the amount of bottom warp 405, except to within some known maximum limit less than the bottom edge bow amount 804.

4. Combining Bottom Edge Bow and Rake Face and Cutting Edge Bow

The aspects of this invention regarding cutting edge bow and bottom edge bow can be combined. If the aspects are combined, one skilled in the art will understand that the corners of the insert 409, such as corner 411, will not raise up during brazing. Rather, the middle of the insert 412 will sink. Regardless of whether the corners rise or the middle sinks, the resultant cutting edge profile still remains the same. More specifically, with regards to FIG. 7, it should be understood that instead of middle point 505 substantially remaining at diameter 703 and corner 506 rising to meet that diameter 703 during brazing, corner 506 will instead remain substantially at diameter 704 and middle point 505 will descend from diameter 703 to meet it. Therefore, the preferred calculation for the combined methods should consider diameter 704 to be the intended cutting edge diameter and diameter 703 to be the calculated diameter. Consequently: (DIAMETER of 703)= (DIAMETER of 704)+2*(DIAMETRIC RADIAL DISTANCE 702). Other calculations and method steps would otherwise proceed normally.

5. Sinusoidal Face Tools

Prior to this invention, producing a PCD-tipped rotary cutting tool with fine non-linear geometry along the rake face and a tightly-toleranced cutting edge profile and diameter would have been difficult or impossible. Because of the problems associated with braze-induced warp, either the geometry of the rake face or the profile of the cutting edge would be compromised when finish grinding or EDM operations were performed to bring the brazed and warped cutting edge into conformity with the desired tool specifications.

Figure 10A:
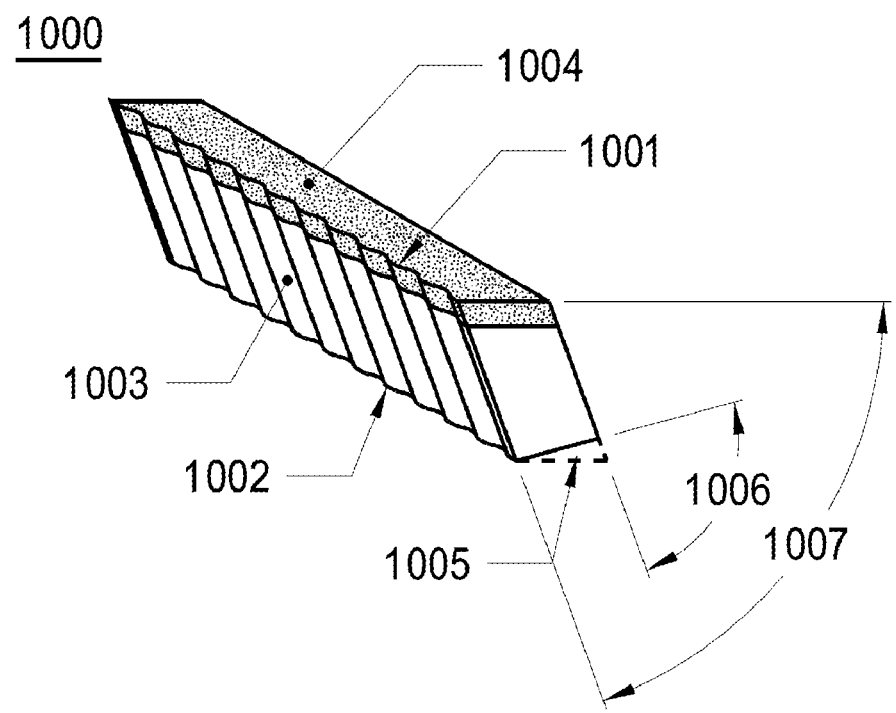
FIGS. 10A and 10B are perspective and top views, respectively, of a cutting tool insert, in accordance with this invention.
Figure 10B:
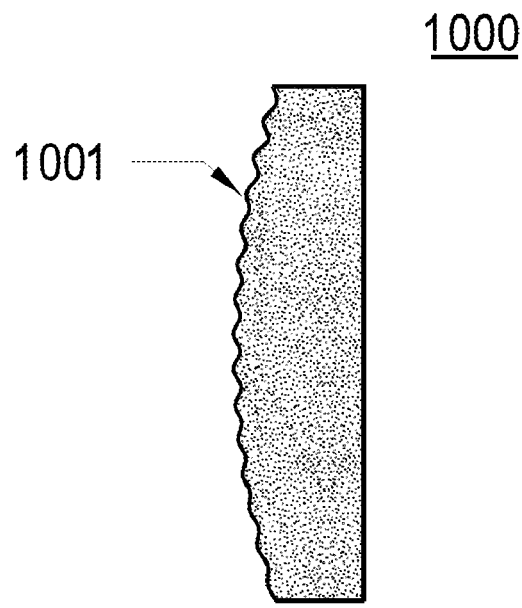

Using aspects of this invention, manufacturers can now create inserts and tools with intricate rake face geometry and still maintain close cutting edge profile and diameter tolerances. As an example, FIG. 10A is a perspective view of a sinusoidal face insert 1000, in accordance with an embodiment of the claimed invention. FIG. 10A shows the sinusoidal face insert 1000 with a cutting edge 1001, a bottom edge 1002, a rake face 1003, a relief surface 1004, and a preferably removed portion 1005. FIG. 10B shows an exaggerated view of the bow of the rake face, as described with respect to FIGS. 5A and 5B. The portion 1005 may be removed by any practical material removal process, such as grinding or EDM. The angle 1006, as shown in the figure, may be formed at substantially 90 degrees in order to facilitate later mounting of the insert 1000 in a fluted tool body. As also shown in the figure, included angle 1007 of the insert 1000 may be less than 90 degrees so that the insert 1000 may be mounted to a tool body and no further material must be removed to create an appropriately shaped relief surface 1004 behind the cutting edge 1001.

To create the sinusoidal face insert 1000, a wire EDM cut pattern may be used to produce a rake face 1003 that consists of a series of alternating curved surfaces. The interface of the rake face 1003 and the relief surface 1004 produces the sinusoidal cutting edge 1001. It is preferred that the curves in the rake face 1003 and/or on the cutting edge 1001 are a substantially sinusoidal wave pattern; however, they may also be formed from alternating equal radiuses, alternating unequal radiuses, alternating radiuses and straight portions, alternating straight portions, or any combination thereof. As previously stated, the methods and aspects for compensating for warpage claimed herein can be applied to the sinusoidal face type insert 1000, or any other type known or developed.

Figure 11A:
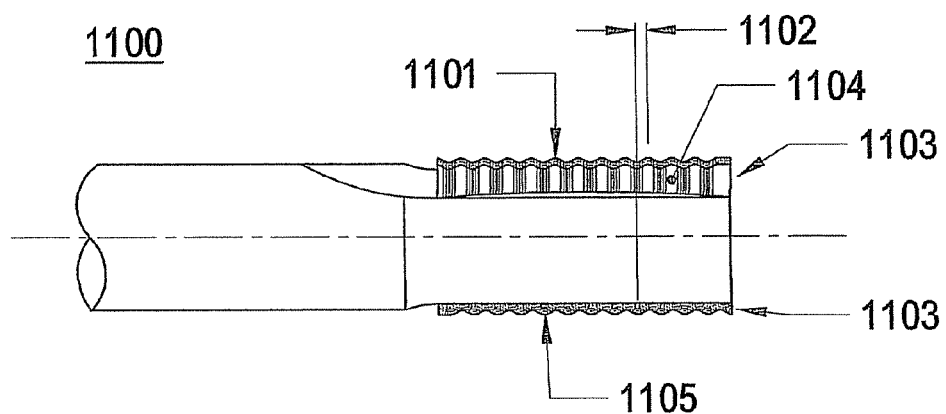
FIGS. 11A and 11B are side and end views, respectively, of rotary cutting tools, in accordance with this invention.
Figure 11B:
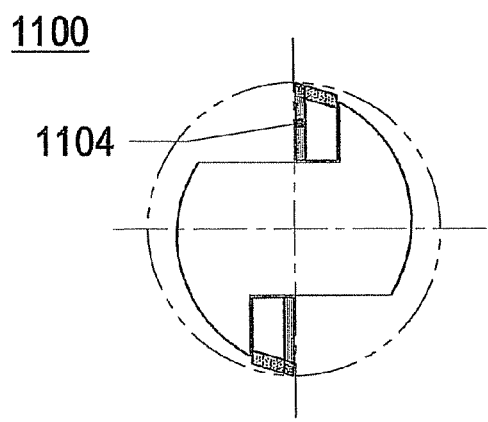
Figure 11C:
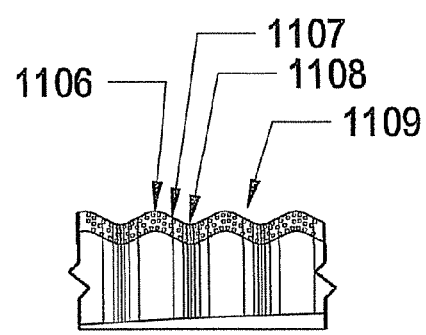
FIG. 11C is a side view of a cutting edge, in accordance with this invention.

FIGS. 11A through 12C demonstrate preferred rotary cutting tools that are producible using the aspects and methods of this invention. Though specific tools are illustrated here as exemplars, it should be understood that the aspects and methods of this invention may apply to the complete spectrum of brazed rotary cutting tools, such as endmills, router bits, shapers, drills, reamers, counterbores, countersinks, and taps. FIGS. 11A and 11B show the side view and end view, respectively, of an endmill style rotary cutting tool 1100 with brazed inserts 1103. The cutting tool 1100 has a sinusoidal cutting edge 1101 and a sinusoidal cutting edge 1105, a bowed and sinusoidal rake face 1104, and a bowed bottom edge 1106, shown exaggerated here. It is preferred that the curves in the rake face 1104 and/or on the cutting edge 1101 and 1105 are of a substantially sinusoidal wave pattern; however, one skilled in the art will recognize that they may also be formed from alternating equal radiuses, alternating unequal radiuses, alternating radiuses and straight portions, alternating straight portions, or any combination thereof. As an example, FIG. 11C shows a cutting edge 1109 with alternating radiuses 1106 and 1108 and straight portion 1107. It is known by those skilled in the art that various cutting edge patterns, such as the sinusoidal cutting edges 1101 and 1105, can provide benefits for machining various materials. For example, some endmills with alternating curves on the cutting edge are known to provide superior cutting characteristics in fibrous materials such as carbon fiber and Kevlar composites.

Opposing cutting edges 1101 and 1105 are preferably aligned such that the distance between cutting edge peaks is offset by some distance 1102. Preferably, the distance is approximately half the distance between two adjacent peaks on any single cutting edge. For rotary cutting tools with more than two opposing cutting edges, each peak would be offset from the corresponding peak on the immediately prior cutting edge by an amount equal to the distance between any two adjacent peaks on any single cutting edge divided by the number of cutting edges. During operation of the rotary cutting tool, the offset 1102 allows subsequent cutting edges to "clean up" any material not removed by the passage of the prior cutting edge through the material. Producing a tool such as cutting tool 1100 without using the methods of this invention to form a bowed rake face 1104 or bowed bottom edge 1102 would require extensive finish grinding or EDM machining to compensate for the effects of brazing-induced warp. By using wire EDM to produce a bowed insert, such an insert may be brazed to a tool body in order to produce a finished cutting edge without the need for finishing operations on the cutting edge.

Figure 12A:
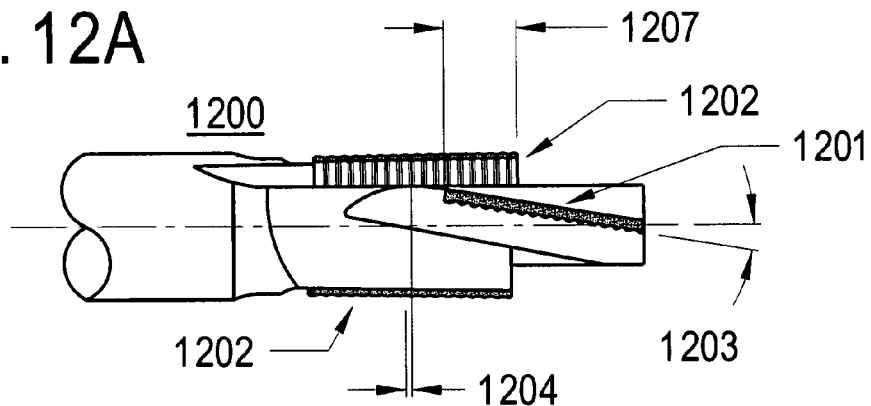
FIGS. 12A, 12B, and 12C are side and end views of rotary cutting tools, in accordance with this invention.
Figure 12B:
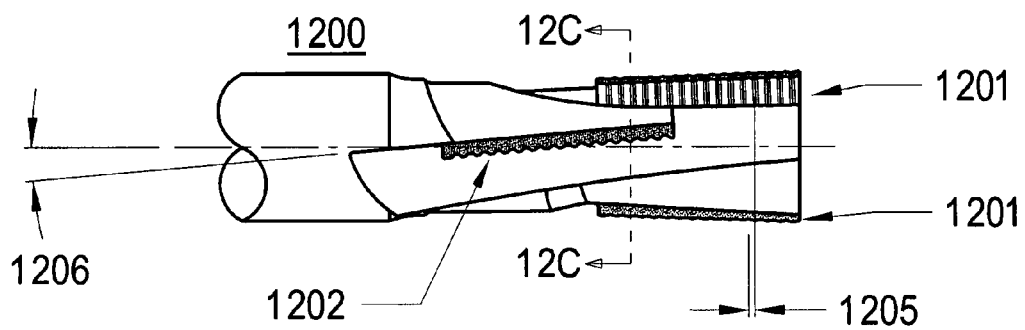
Figure 12C:
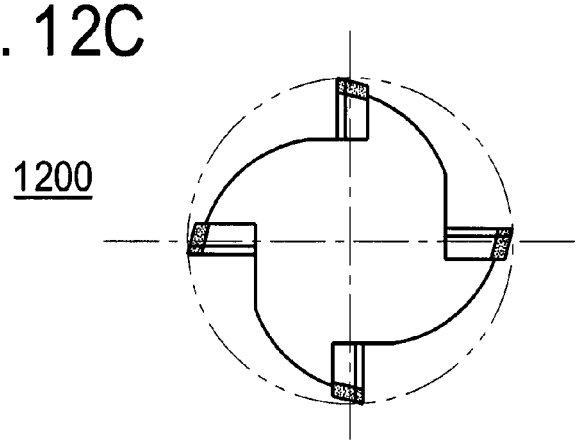

FIGS. 12A through 12C show a double edged compression style endmill 1200. One skilled in the art will recognize that in a right-hand rotation compression endmill, as is illustrated here, one or more cutting edges are provided in a right-hand helix or shear configuration and these cutting edges are located nearest the tip of the tool. Overlapping the cutting path of the right-hand helix or shear cutting edges are one or more left-hand helix or shear cutting edges located nearest the shank of the tool. The left- and right-hand helix or shear configurations are reversed for a left-hand rotation tool.

This opposing orientation of cutting edges is particularly useful in cutting fibrous materials that tend to fray. The right-hand helix or shear compresses the bottom surface of the material to be cut against the inner core of the material to be cut, thus preventing fraying of the bottom cut edge. The left-hand helix or shear compresses the top surface of the material to be cut against the inner core of the material to be cut, thus preventing fraying of the top cut edge.

In the figures provided here, sinusoidal inserts 1202 have been mounted in a left-hand orientation at some shear or helix angle 1206. If configured as a shear angle, the preferred shear angle 1206 varies between 1 degree and 15 degrees. If configured as a helix angle, the helix angle 1206 may vary between 1 degree and 60 degrees. Preferably, the helix angle 1206 is between 2 degrees and 30 degrees, and more preferably between 2 degrees and 15 degrees. It should be noted that angle 1206 is limited by the thickness of the PCD layer 101. The thicker the layer, the higher the sustainable helix angle over a practical cutting edge length. Sinusoidal inserts 1201 are mounted in a right hand orientation at some shear or helix angle 1203. The same normal and preferred ranges for angle 1206 apply to angle 1203.

The cutting edges formed by inserts 1202 and 1201 preferably overlap by some specified distance 1207. For the pair of opposing cutting edges formed by inserts 1202, the cutting edges are preferably aligned such that the distance between cutting edge peaks is offset by some distance 1204. The same is true for the opposing cutting edges formed by inserts 1201. The cutting edges are aligned such that the distance between cutting edge peaks is offset by some distance 1205. Preferably, the distance between peaks 1204 and the distance between peaks 1205 is half the distance between any two peaks on a respective single cutting edge. For rotary cutting tools with more than two cutting edges per helix or shear section, the offsets are defined according to the formula provided above in the discussion of FIG. 11.

In the foregoing detailed description, numerous specific details are set forth in order to provide a thorough understanding of the embodiments described herein. The embodiments of tools and methods described herein are merely illustrative and other embodiments are possible. In view of the wide variety of embodiments to which the principles of the present invention can be applied, it should be understood that the embodiments described herein should not be taken as limiting the scope of the present invention. Those skilled in the art will appreciate that different methods of manufacture and different tool styles can be included without departing from the scope of the inventions detailed here. For example, the carbide and PCD disk 100 could contain additional material layers. Because a multi-layer disk could also exhibit adverse effects of braze induced warp, such a disk should be considered within the scope of the invention. Further, the claims should not be read as limited to the described order or elements unless stated to that effect.

All embodiments that come within the scope and spirit of the following claims and equivalents thereto are claimed as the invention. It will be understood, however, that changes and modifications may be made to the invention without deviating from its true spirit and scope, as defined by the following claims.

We claim:

1. A brazeable insert for a rotary cutting tool, comprising:
   a wear layer;
   a carbide layer;
   a cutting edge relief surface; and
   a rake face, wherein the rake face exhibits a bowed profile adapted to compensate for brazing-induced warp of a cutting edge formed by the interface of the rake face and the cutting edge relief surface, wherein the bowed rake face profile comprises pre-determined variations of rake face offset along the cutting edge such that the rake face offset is relatively larger for portions of the cutting edge that exhibit an increase in cutting-edge diameter due to brazing induced warp of the insert, and relatively smaller for portions of the cutting edge that exhibit a decrease in cutting-edge diameter due to brazing induced warp of the insert.

2. The brazeable insert of claim 1, further comprising:
a bottom relief, wherein the bottom relief exhibits a non-zero amount of bottom edge bow after brazing-induced warping of the bottom surface.

3. The brazeable insert of claim 1, wherein the wear layer is polycrystalline diamond.

4. The brazeable insert of claim 1, wherein the wear layer is polycrystalline cubic boron nitride.

5. The brazeable insert of claim 1, wherein the rake face further exhibits a profile substantially resembling a wave form.

6. A brazed rotary cutting tool, comprising:
a tool body; and
a plurality of inserts brazed to the tool body, wherein each insert comprises a wear layer and a carbide substrate, wherein the inserts form at least two cutting edges, wherein a portion of each cutting edge exhibits a profile substantially resembling a first wave form, and wherein the locations of first wave form peaks along the longitudinal length of each cutting edge are offset from one cutting edge to another, and further wherein each insert has a rake face profile substantially resembling a second wave form and the rake face profile of each insert further has a bowed profile adapted to compensate for braze-induced cutting edge warp, wherein the bowed rake face profile comprises pre-determined variations of rake face offset along the cutting edge such that the rake face offset is relatively larger for portions of the cutting edge that exhibit an increase in cutting-edge diameter due to brazing induced warp of the insert, and the rake face offset is relatively smaller for portions of the cutting edge that exhibit a decrease in cutting-edge diameter due to brazing induced warp of the insert.

7. The brazed rotary cutting tool of claim 6, wherein the first wave form is sinusoidal.

8. The brazed rotary cutting tool of claim 6, wherein the first wave form is alternating substantially equal radiuses.

9. The brazed rotary cutting tool of claim 6, wherein the wave form is alternating unequal radiuses.

10. The brazed rotary cutting tool of claim 6, wherein the first wave form is alternating radiuses and straight portions.

11. The brazed rotary cutting tool of claim 6, wherein the first wave form is alternating straight portions.

* * * * *